United States Patent
Ahn et al.

(10) Patent No.: US 7,570,692 B2
(45) Date of Patent: Aug. 4, 2009

(54) APPARATUS AND METHOD FOR TRANSMITTING MPEG-4 DATA SYNCHRONIZED WITH MPEG-2 DATA

(75) Inventors: Sang-Woo Ahn, Taejon (KR); Jin Soo Choi, Taejon (KR); Yong Suk Kim, Seoul (KR); Munchurl Kim, Taejon (KR); Jin Woong Kim, Taejon (KR); Chieteuk Ahn, Taejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1087 days.

(21) Appl. No.: 10/466,163

(22) PCT Filed: Dec. 21, 2001

(86) PCT No.: PCT/KR01/02234

§ 371 (c)(1),
(2), (4) Date: Oct. 28, 2003

(87) PCT Pub. No.: WO02/058388

PCT Pub. Date: Jul. 25, 2002

(65) Prior Publication Data

US 2004/0057457 A1    Mar. 25, 2004

(30) Foreign Application Priority Data

Jan. 13, 2001    (KR) ................................. 2001-2055

(51) Int. Cl.
  *H04N 7/52*    (2006.01)
(52) U.S. Cl. .................................. 375/240.28; 370/466
(58) Field of Classification Search ............ 375/240.01, 375/240.28
  See application file for complete search history.

(56) References Cited

U.S. PATENT DOCUMENTS 6,079,566 A * 6/2000 Eleftheriadis et al. ....... 707/101

FOREIGN PATENT DOCUMENTS

KR    1019990245842    12/1997

(Continued)

OTHER PUBLICATIONS

International Standards ISO/IEC 13818-1, Information Technology-Generic coding of moving pictures and associated audio information: Systems, Dec. 1, 2000, pp. 8, 41-42, 75-76, 85-96 and 150-152.*

(Continued)

*Primary Examiner*—David Czekaj
(74) *Attorney, Agent, or Firm*—Blakely, Sokoloff, Taylor & Zafman LLP (57) ABSTRACT

An apparatus and method for transmitting MPEG-4 data synchronized to MPEG-2 data is disclosed. The apparatus for transmitting MPEG-4 data synchronized to MPEG-2 data includes: an object separation unit for extracting MPEG-4 object data from MP4 data, separating meta information from the object data, and generating program information and synchronization information; a conversion unit for converting the MPEG-4 object data to MPEG-4 packets of which data structure is the same as that of MPEG-2 data, based on the program information and synchronization information; and a multiplexing unit for multiplexing the MPEG-4 packets with the MPEG-2 data.

13 Claims, 4 Drawing Sheets

FOREIGN PATENT DOCUMENTS

| KR | 10-1999-0014094 A | | 2/1999 |
|----|-------------------|---|--------|
| KR | 1999-0058772 | | 7/1999 |
| KR | 1020000002152 | | 1/2000 |
| WO | WO 99/21337 | * | 4/1999 |

OTHER PUBLICATIONS

"MPEG-4 Systems: Overview", O. Avaro, et al., Image Communication, Elsevier Science Publishers, Amsterdam, vol. 15, Jan. 2000, pp. 281-298.

* cited by examiner

APPARATUS AND METHOD FOR TRANSMITTING MPEG-4 DATA SYNCHRONIZED WITH MPEG-2 DATA

The present patent application is a non-provisional application of International Application No. PCT/KR01/02234, filed Dec. 21, 2001.

TECHNICAL FIELD

The present invention relates to an apparatus and method for transmitting moving picture expert group-4 (MPEG-4) data, which can be used as supplemental data, synchronized with MPEG-2 audio/video data and to a computer readable recording medium storing instructions for executing the same method.

BACKGROUND ARTS

A conceptual technique has been introduced for synchronizing a MPEG-2 data, which is audio and video data for broadcasting, communicating and storing media, with a MPEG-4 data, which is digital audio and video data having a 64 kbps transmission rate. However, an implementation method for synchronizing the MPEG-2 data with the MPEG-4 data and an implementation system for transmitting the MPEG-4 data synchronized with the MPEG-2 data has not been proposed. Therefore, a service of transmitting MPEG-4 data synchronized with MPEG-2 data also cannot be provided in a real world.

DISCLOSURE OF THE INVENTION

It is, therefore, an object of the present invention to provide an apparatus and method for synchronizing MPEG-2 data, which is audio/video data for broadcasting, communicating and storing media, with MPEG-4 data, which is digital audio/video data, and transmitting the MPEG-4 synchronized with the MPEG-2 data and a computer readable recording medium storing instructions for executing the same method.

In accordance with an aspect of the present invention, there is provided an apparatus for generating and transmitting moving picture expert group-4 (MPEG-4) data synchronized with a MPEG-2 data, including: object separating and information generating unit for extracting MPEG-4 object data and meta information related to the MPEG-4 object data from mp4 data which is a storage type of the MPEG-4 data, for analyzing the meta information and for generating program information and synchronization information; packetizing unit for converting the MPEG-4 object data to a MPEG-4 transport stream (TS) packet having a data format of MPEG-2 data by using the meta information, the program information and the synchronization information in order to synchronize the MPEG-4 object data with the MPEG-2 data; and program multiplexing unit for multiplexing the MPEG-4 TS packet and the MPEG-2 data and for generating and outputting a transport stream packet.

In accordance with another aspect of the present invention, there is provided a method for generating and transmitting MPEG-4 data synchronized with MPEG-2 data, including the steps of: a) extracting MPEG-4 object data and meta information related to the MPEG-4 object data from mp4 data, which is a storage type of the MPEG-4 data and analyzing the meta information; b) packetizing the MPEG-4 object data by using meta information, thereby generating a primary packetized MPEG-4 object data, a flexible multiple (FlexMux) packet; c) generating synchronization information and program information by using the meta information and header information of the FlexMux packet; d) packetizing the FlexMux packet by using the meta information, the synchronization information and the program information, thereby generating a secondary packetized MPEG-4 object data, a MPEG-4 transport stream (TS) packet; and e) multiplexing the MPEG-4 TS packet and MPEG-2 data and outputting a transport stream (TS) packet.

In accordance with still another aspect of the present invention, there is provided a computer readable record medium storing instructions for executing a method for transmitting MPEG-4 data synchronized with MPEG-2 data, the method including the steps of: a) extracting MPEG-4 object data and meta information related to the MPEG-4 object data from mp4 data, which is a storage type of the MPEG-4 data and analyzing the meta information; b) packetizing the MPEG-4 object data by using meta information, thereby generating a primary packetized MPEG-4 object data, a flexible multiple (FlexMux) packet; c) generating synchronization information and program information by using the meta information and header information of the FlexMux packet; d) packetizing the FlexMux packet by using the meta information, the synchronization information and the program information, thereby generating a secondary packetized MPEG-4 object data, a MPEG-4 transport stream (TS) packet; and e) multiplexing the MPEG-4 TS packet and MPEG-2 data and outputting a transport stream (TS) packet.

BRIEF DESCRIPTION OF THE DRAWINGS

The above and other objects and features of the present invention will become apparent from the following description of the preferred embodiments given in conjunction with the accompanying drawings, in which.

MODES FOR CARRYING OUT THE INVENTION

Other objects and aspects of the invention will become apparent from the following description of the embodiments with reference to the accompanying drawings, which is set forth hereinafter.

Figure 1:
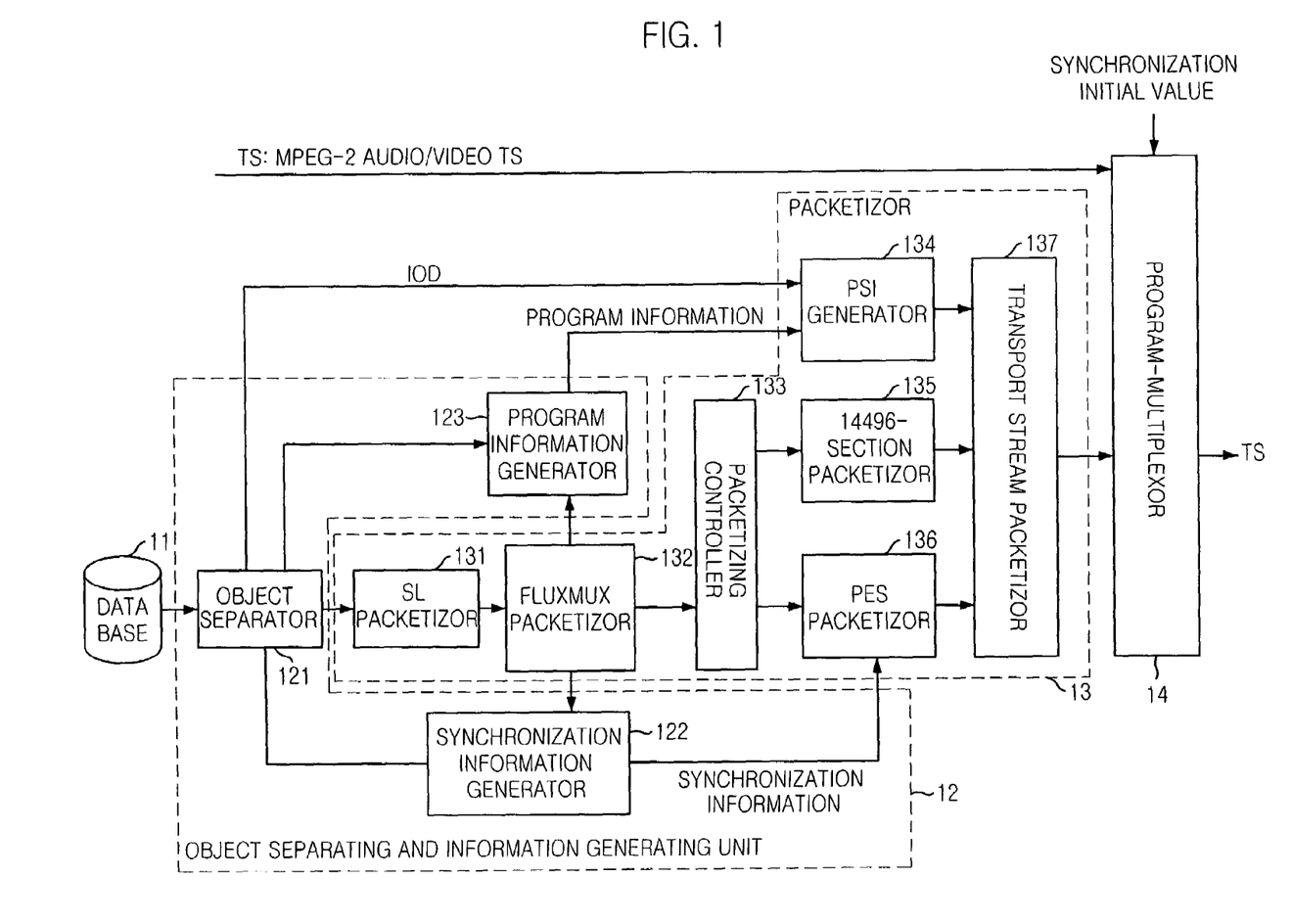
FIG. 1 is a block diagram illustrating an apparatus for generating and transmitting MPEG-4 data synchronized with MPEG-2 data in accordance with a preferred embodiment of the present invention.

FIG. 1 is a block diagram illustrating an apparatus for generating and transmitting MPEG-4 data synchronized with MPEG-2 data in accordance with the preferred embodiment of the present invention.

Referring to FIG. 1, the apparatus for generating and transmitting MPEG-4 data synchronized with MPEG-2 data includes an object separating and information generating unit 12, a packetizor 13 and a program multiplexor 14. The object separating and information generating unit 12 receives an mp4 file, which is a storing type of the MPEG-4 data, from a database 11, extracts MPEG-4 object data and meta information related to the MPEG-4 object data from the mp4 file and analyzing the meta information and generates program information and synchronization information. The packetizor 13 converts the MPEG-4 object data to a MPEG-2 type packet by using the program information and the synchronization information for synchronizing the extracted MPEG-4 object data with the MPEG-2 data. The program multiplexor 14 multiplexes the packetized MPEG-4 data inputted from the packetizor 13 and the MPEG-2 audio and video data.

The object separating and information generating unit 12 includes an object separator 121, a synchronization information generator 122 and a program information generator 123.

The object separator 121 receives an mp4 file, which is a storage type of the MPEG-4 data, from a database 11. The database 11 contains mp4 files each having MPEG-4 object data and meta information. The object separator 121 extracts the MPEG-4 object data from the received mp4 file and analyzes the meta information related to the MPEG-4 object data, for example, a class, a location, a characteristic and a size of MPEG-4 object data. The object separator 121 outputs a MPEG-4 initial object descriptor (IOD) among the extracted MPEG-4 data to a program specific information (PSI) generator 134, outputs a composition time stamp (CTS) and decoding time stamp (DTS) to the synchronization information generator 122, outputs an elementary stream identifier (ES_ID) to the program information generator 123, and the other MPEG-4 object data and meta information outputs to a SL packetizor 131.

The synchronization information generator 122 receives the CTS/DTS meta information from the object separator 121 and converts it to a presentation time stamp (PTS)/DTS, which is a MPEG-2 time value. The synchronization information generator 122 generates synchronization information as shown in following Table 1 to packetizor 136 based the converted PTS/DTS time value and length information of a FlexMux packet inputted from the flexible multiplex (FlexMux) packetizor 132, and outputs the synchronization information to a packetized elementary stream (PES).

However, the program information generator 123 generates the program information as shown in following Table 2 by coupling the ES_ID meta information inputted from the object separator 121 with a FlexMuxchannel inputted from the FlexMux packetizor 132, and output the program information to the PSI generator 134.

The packetizor 13 includes an SL packetizor 131, a FluxMux packetizor 132, a packetizing controller 133, a PSI generator 134, a 14496-section packetizor 135, a PES packetizor 136 and a TS packetizor 137.

The SL packetizor 131 packetizes the MPEG-4 object data and the meta information inputted from the object separator 121 to a sync layer (SL) packet and outputs the SL packet to the FluxMux packetizor 132. The SL packet is defined by a MPEG-4 standard for synchronizing each object data of the MPEG-4 and includes a header and a payload. The header contains time and sequence information for expressing the MPEG-4 object data at a certain time. The payload contains the MPEG-4 object data an access unit by access unit basis. An IOD is a point for coupling an object descriptor (OD) and a binary format for scene (BIFS), therefore, it cannot be packetized as the SL packet.

Figure 3:
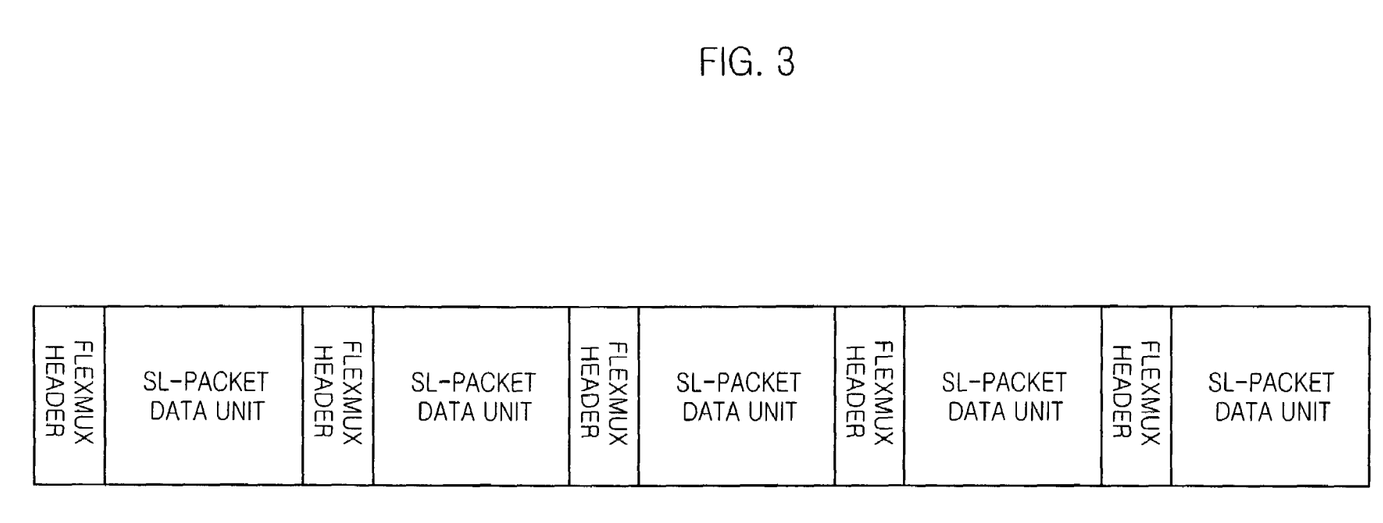
FIG. 3 is a diagram of a FlexMux packetized MPEG-4 data transmitted between a FlexMux packetizor and a packetizing controller in accordance with a preferred embodiment of the present invention.

The FlexMux packetizor 132 packetizes the SL packet inputted from the SL packetizor 131 to generate a FlexMux packet, which has a format as shown in FIG. 3 and the FlexMux packet is outputted to the packetizing controller 133. The FlexMux packet is an option multiplexing type defined in a MPEG-4 system standard and is used for reducing overhead and supplementing a lack of logical channel when multiplexing a plurality of the SL packetized streams concurrently. The FlexMux packet is composed of a header and payload. The payload of FlexMux packet has to include the complete SL packet. There are two FlexMux packetizing modes. One is a Simple mode that the payload contains only one SL packet and other is a MuxCode mode that the payload contains a plurality of SL packets.

The packetizing controller 133 analyzes the FlexMux packet inputted from the FlexMux packetizor 132 and outputs the MPEG-2 data, data necessary for synchronization such as BIFS-animation data, audio and video data to the PES packetizor 136 and outputs the data unnecessary for synchronization such as BIFS-command data and the OD data to the 14496-section packetizor 135.

The PSI generator 134 generates a descriptor related to the MPEG-4 based on the program information inputted from the program information generator 123 and generates a program map table (PMT) which contains all the MPEG-2 data and the MPEG-4 data by using the descriptors and the IOD data inputted from the object separator 121. The PMT is outputted to the TS packetizor 137.

The 14496-section packetizor 135 packetizes the FlexMux data inputted from the packetizing controller 133 and outputs the packetized FlexMux data to the TS packetizor 137.

The PES packetizor 136 packetizes the FlexMux data, which is necessary to be synchronized and is inputted from the packetizing controller 133, to a PES packet by using the synchronization information inputted from the synchronization information generator 122 and outputs the PES packet to the TS packetizor 137.

The TS packetizor 137 packetizes a program association table (PAT), which is a program specific information (PSI) inputted from the PSI generator 134, a program map table (PMT) packet and 14496-section packetized MPEG-4 data inputted from the 14496-section packetizor 135 to the TS packet. The TS packet is outputted to the program multiplexor 14.

The program multiplexor 14 multiplexes the MPEG-4 TS packet inputted from the TS packetizor 137 and the MPEG-2 audio and video data inputted from the outside to generate one TS packet. The program multiplexor 14 receives a synchronization initial value (offset) and uses it as parameter value for multiplexing two TS packets to one TS packet.

Figure 2:
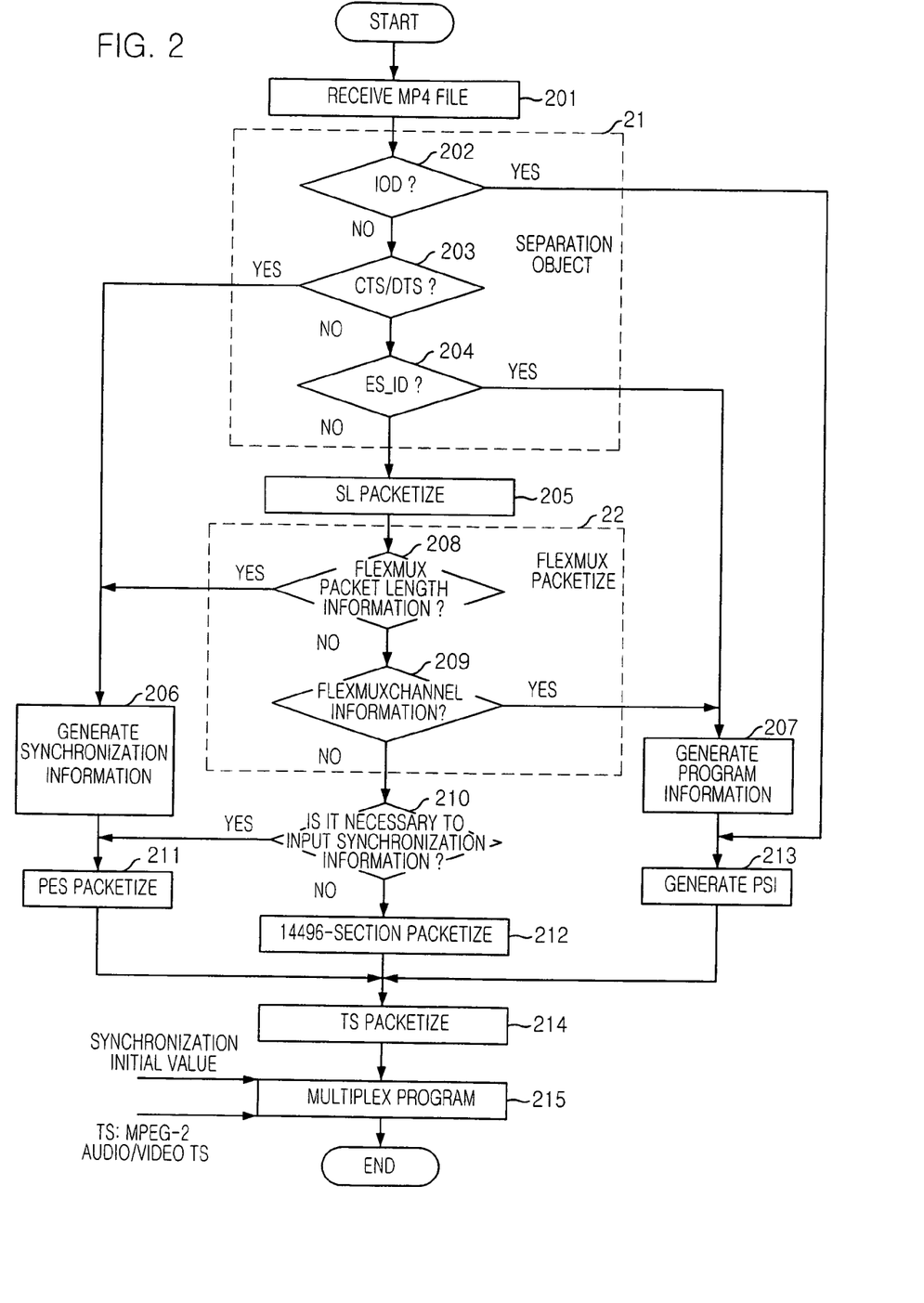
FIG. 2 is a flowchart illustrating a method for generating and transmitting the MPEG-4 data synchronized with the MPEG-2 data in accordance with a preferred embodiment of the present invention.

FIG. 2 is a flowchart illustrating a method for generating and transmitting the MPEG-4 data synchronized with the MPEG-2 data in accordance with the preferred embodiment of the present invention.

At first, the mp4 file stored in the database is inputted to the object separator 121 at step 201. A MPEG-4 object data is separated from inputted mp4 file at step 21. At the step 21, meta information of each object data, e.g., an IOD, an ES_ID and a CTS/DTS is extracted at steps 201 to 203. The extracted IOD is used for generating a PSI at step 213 and other meta information is used for packetizing an OD, a BIFS, audio and video data to generate a SL packetized data at step 205.

The SL packetized data is FlexMux packetized at step 22. In step 22, meta information is generated such as a FlexMux packet length at step 208 and FlexMux channel information at step 209.

The CTS/DTS extracted at object separation step 203 and the FlexMux packet length information generated at the FlexMux packetizing step 208 are inputted as data for generating the synchronization information and the synchronization information is generated at step 206. The ES_ID extracted from the object separation step 203 and the FlexMuxChannel generated at the FlexMux packetizing step 209 is inputted as data for generating the program information and the program information is generated at step 207.

If the FlexMux packetized data needs to be synchronized with the MPEG-2 data at step 210, then it is packetized to the PES packet at step 211. If it does not need to be synchronized, then it is 14496-section packetized at step 212.

The PSI is generated at step 213 based on the IOD extracted at the object extracting step 21 and the program information generated at step 207 such as PAT and PMT.

At step 214, the PES data, 14496-section data and the PSI data are packetized as the TS packet and the TS packet is multiplexed with the MPEG-2 audio and video data by inputting the synchronization initial value (offset). Finally, the multiplexed TS packet is outputted at step 215.

FIG. 3 is a block diagram of a FlexMux packetized MPEG-4 data transmitted between of a FlexMux packetizor and a packetizing controller in accordance with the preferred embodiment of the present invention.

The MPEG-4 data is composed of objects such as an IOD, an OD, a Scene Description, audio and video contents data. The IOD data is separated at the object separator 121 shown in FIG. 1 and inputted to the PSI generator 134. Other objects except the IOD are packetized to the SL packet and the FlexMux packet. A transmission protocol between the FlexMux packetizor 132 and the packetizing controller 133 uses the FlexMux data type as shown in the FIG. 3.

The FlexMux data structure is corresponding to the synchronization information structure and it makes synchronization of MPEG-2 data with MPEG-4 data possible and a file name extension of the FlexMux data type is defined as ".mpeg4".

The synchronization information of which construction represents a PTS/DTS time value used for packetizing the MPEG-4 data to the PES packet in order to synchronize the MPEG-2 data with the MPEG-4 data in accordance with the preferred embodiment of the present invention.

The synchronization information is generated at the synchronization information generator 122 in FIG. 1 and includes the PTS/DTS time value, which is converted from CTS/DTS meta information inputted from the object separator 121 by using Equations 1 and 2 and the length information of the FlexMux inputted form the FlexMux packetizor 132.

TABLE 1

| Syntax | No. of bits |
|---|---|
| Mpeg4hint{ | |
| For(I=0;i<N1; i++){ | |
| FlexMux_packet.length | 8 |
| PTS_DTS_flags | 2 |
| Reserved | 6 |
| If(PTS_DTS_flags = = 0x10) {"0010"} | 4 |
| else if(PTS_DTS_flags = = 0x11){"0011"} | |
| PTS[32 . . . 30] | 3 |
| marker_bit | 1 |
| PTS[29 . . . 15] | 15 |
| market_bit | 1 |
| PTS[14 . . . 0] | 15 |
| market_bit | 1 |
| "0001 | 4 |
| DTS[32 . . . 30] | 3 |
| market_bit | 1 |
| DTS[29 . . . 15] | 15 |
| market_bit | 1 |
| DTS[14 . . . 0] | 15 |
| market_bit | 1 |
| reserved | 8 |
| reserved | 8 |

TABLE 1-continued

| Syntax | No. of bits |
|---|---|
| reserved | 8 |
| reserved | 8 |
| } | |
| } | |

In Table 1, "N1" denotes a number of FlexMux packets having a time value existing in the FlexMux data.

8 bits are allocated to the FlexMux_packet_length in Table 1 and "No. of bits" shows a number of bits of each FlexMux packet composing the FlexMux bit array in the FIG. 3 for representing the synchronization information. A length of the FlexMux packet including the header of the FlexMux is greater than 255 bytes and it can be controlled in application.

"PTS_DTS_flags" in Table 1 indicates whether the PTS and DTS information is existed and 2 bits are allocated to the PTS_DTS_flags. "0x10" means that PTS information is in the synchronization information file and "0x11" means that both PTS and DTS information are in the synchronization information file. Also "0x00" means that the PTS and DTS information are not existed in the synchronization information file and "0x01" is not used. 6 bits are allocated to "reserved" and "reserved" has a value "11. 1111" and 2 bits are allocated to "marker_bit" and "marker_bit" has a value "1". "PTS[32. . 30]", "DTS[29. . 15]" and "DTS[14. . 0]" are converted values by using MPEG-4 DTS information.

"DTS[32. . 30]", "DTS[29. . 15]" and "DTS[14. . 0]" are values converted the MPEG-4 DTS information by using Equation 2.

"reserved" to which 8 bits are allocated has a value of "1111. 1111" and it is used as extra bits for expanding the PTS and DTS.

$$PTS_{MPEG4}(t) = CTS(t) \times \left(\frac{90}{OCRResolution}\right) \qquad \text{Eq. 1}$$

$$DTS_{MPEG4}(t) = DTS(t) \times \left(\frac{90}{OCRResolution}\right) \qquad \text{Eq. 2}$$

In Equations 1 and 2, the object clock reference (OCR) resolution is an integer number thus "90/OCRResolution" will be either 45 kHz, 30 kHz or 22.5 kHz. That is, for synchronizing the MPEG-4 data and MPEG-2 data, basically the time reference value of the MPEG-4 and the PCR of the MPEG-2 has to be matched, thus "90/OCRResoultion" is a value for correcting different time values between the MPEG-4 and MPEG-2.

By using the synchronization information generated at the PES packetizor 136 in FIG. 1, a time value for PES packetizing can be more easily inputted. In other words, it is possible to omit a step of analyzing the FlexMux data for inputting a PES packetizing time value since the synchronization information is one of meta information of the FlexMux data. In here, ".mpeg4hint" is allocated as a file extension of the synchronization information.

The program information of which a format is described in a following Table 2 couples as an ES_ED of the MPEG-4 and a FlexMuxChannel for expressing the MPEG-4 data in program information of the MPEG-2 in accordance with the present invention.

The program information in Table 2 is generated from the program information generator 123 in FIG. 1 and it is constructed by coupling the ES_ID of MPEG-4 object data, which is meta information inputted from the object separator 121, and the FlexMuxChannel inputted from the FlexMux packetizor 132. By using the program information format in Table 2, the PSI generator 134 constructs a FlexMuxChannel_Descriptor conveniently when generating PMT, which is one of the program information. In other words, the PSI generator 134 automatically allocates the ES_ID of MPEG-4 object data and FluxMuxChannel without analyzing the FluxMux data or without user's input by generating the program information at the program information generator 123. The program information has the file extension name as ".fmc".

TABLE 2

| Syntax | No. of bits |
|---|---|
| FMC ( ) { | |
|     For(i=0;i<N2; i++){ | |
|         ES_ID | 16 |
|         FlexMuxChannel | 8 |
|     } | |
| } | |

"N2" in Table 2 denotes a number of FlexMuxChannels which need to be defined. "ES_ID" to which 16 bits are allocated denotes a value (ID) recognizing the MPEG-4 object data in order to represent the program information.

"FlexMuxChannel" to which 8 bits are allocated in Table 2 denotes a number of FlexMuxChannels used in each FlexMuxChannel packet having a FlexMux bit stream shown in FIG. 3. An index value of first 8 bits existed in a header of the FlexMux packet is a value of the FlexMuxChannel.

A multiplexing method in accordance with the present invention is explained as follows. Since MPEG-4 data is synchronous data containing its own time information when it is packetized as an SL/FlexMux packet, the object clock reference (OCR), which is an initial time reference value, is set up as "0" in case the MPEG-4 data is stored as mp4 file type. However, due to the initial time reference value of the MPEG-2 data is an absolute value comparing to the MPEG-4 data, the initial time reference value needs to be corrected by inputting a multiplexing initial value and adding the multiplexing initial value to a PTS/DTS, which is time value of MPEG-4 for synchronizing the MPEG-2 data and the MPEG-4 data. In other words, for synchronizing the MPEG-2 data having the absolute time value and the MPEG-4 data having a relative time value, the multiplexing initial value is used as an insertion point of the MPEG-4 data and it can be expressed as following equations.

$$PTS(t)=PTS_{MPEG4}(t)+\text{Offset} \quad \text{Eq. 3}$$

$$DTS(t)=DTS_{MPEG4}(t)+\text{Offset} \quad \text{Eq. 4}$$

The equations 3 and 4 can be substituted with the equations 1 and 2 and it can be expressed as follow equations.

$$PTS_{MPEG4}(t) = CTS(t) \times \left(\frac{90}{OCRResolution}\right) + \text{Offset} \quad \text{Eq. 5}$$

$$DTS_{MPEG4}(t) = DTS(t) \times \left(\frac{90}{OCRResolution}\right) + \text{Offset} \quad \text{Eq. 6}$$

A left term of the equation 6 denotes DTS(t) of a MPEG-2 system standard and a right term denotes DTS(t) of a MPEG-4 system standard.

Figure 4:
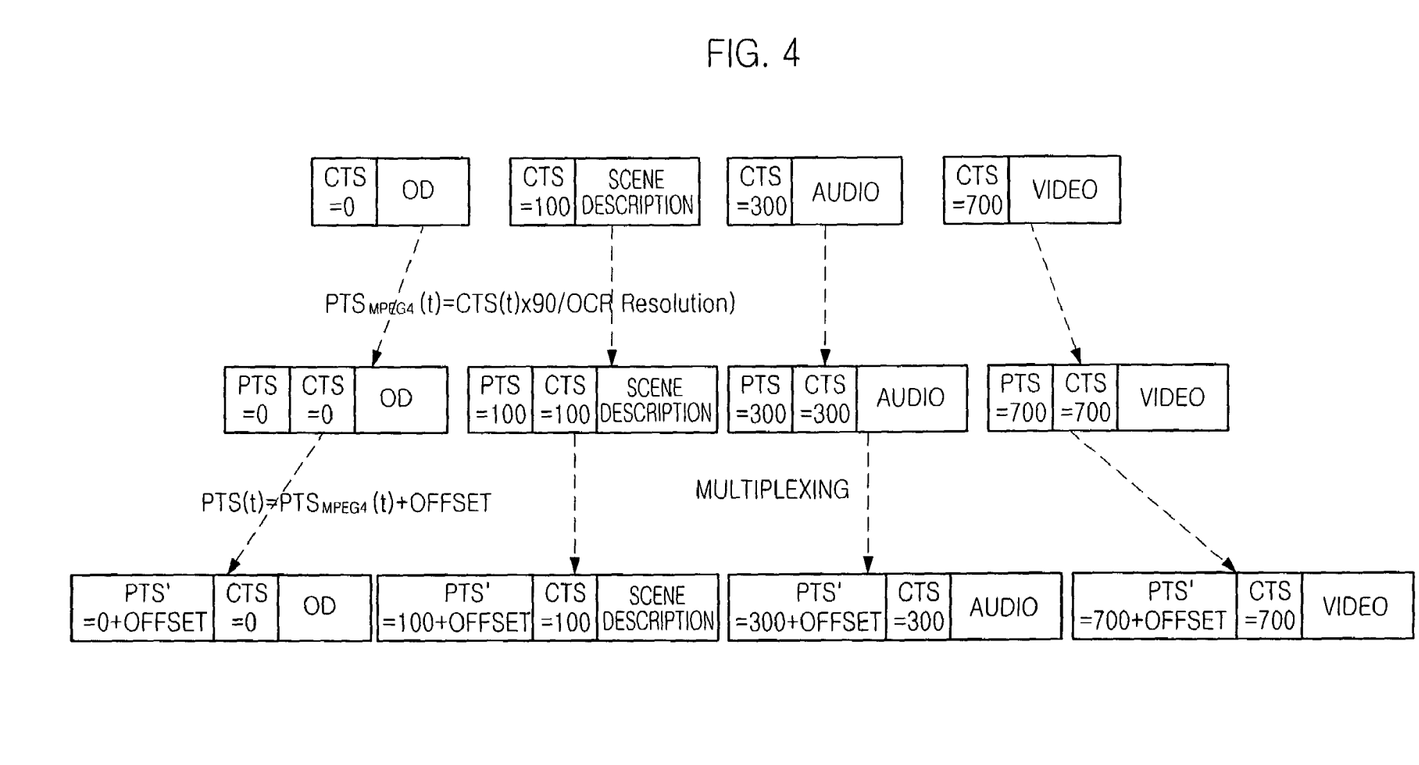
FIG. 4 is a view illustrating an example of inputting a time value for synchronization of the MPEG-4 data by packetizing the MPEG-4 data to a packetized elementary stream (PES) in accordance with a preferred embodiment of the present invention.

FIG. 4 is a view illustrating an example of inputting a time value for synchronization of the MPEG-4 data by packetizing the MPEG-4 data to a packetized elementary stream (PES) in accordance with the present invention.

In FIG. 4, the equations 1 to 6 are applied under an assumption that the PCR of the MPEG-2 data and the OCR of the MPEG-4 data has an identical resolution, which is 90 kHz.

By above-mentioned procedures of the present invention, it is possible to synchronize the MPEG-2 data and related the MPEG-4 data thus the MPEG-4 data, which is supplemental information, can be provided to a user at a desired time.

The above-mentioned method of the present invention can be implemented as a program and it can be stored at computer readable recording medium such as a CD-ROM, a RAM, a ROM, a floppy disk, a hard disk and a magnetic optical disk.

The above mentioned present invention provides a concrete implementation method for transmitting MPEG-4 data, which is used as supplemental information in the digital broadcasting, synchronized with MPEG-2 data and it makes possible to real-time transmission of the MPEG-4 data having a two-way communication function and to allow a random access of a user and increases utilization of the MPEG-2 data and the MPEG-4 data.

While the present invention has been described with respect to certain preferred embodiments, it will be apparent to those skilled in the art that various changes and modifications may be made without departing from the scope of the invention as defined in the following claims.

The invention claimed is:

1. An apparatus for generating and transmitting moving picture expert group-4 (MPEG-4) data synchronized with a MPEG-2 data, comprising:
    object separating and information generating means for extracting MPEG-4 object data and meta information related to the MPEG-4 object data from mp4 data which is a storage type of the MPEG-4 data, for analyzing the meta information and for generating program information and synchronization information, wherein said synchronization information is generated by using a composition time stamp (CTS) which is meta information extracted in said object separating means, and a flexible multiplex (FlexMux) packet length information which is a FlexMux packet header information;
    packetizing means for converting the MPEG-4 object data to a MPEG-4 transport stream (TS) packet having a data format of MPEG-2 data by using the meta information, the program information and the synchronization information in order to synchronize the MPEG-4 object data with the MPEG-2 data; and
    program multiplexing means for multiplexing the MPEG-4 TS packet and the MPEG-2 data and for generating and outputting a transport stream packet.

2. The apparatus as recited in claim 1, wherein said object separating and information generating means includes:
    object separating means for extracting the MPEG-4 object data and the meta information related to the MPEG-4 object data from the mp4 data which is a storage type of the MPEG-4 data, and for analyzing the meta information;
    synchronization information generating means for generating the synchronization information wherein said FlexMux packet length information is generated in said packetizing means; and
    program information generating means for generating the program information by using an elementary stream identifier (ES_ID) which is meta information extracted in said object separating means, and a FluxMuxChannel information which is the FluxMux packet header information generated in said packetizing means.

3. The apparatus as recited in claim 1 or 2, wherein said packetizing means includes:
  SL packetizing means for packetizing the MPEG-4 object data and generating a sync layer (SL) packet by using the meta information;
  FlexMux packetizing means for packetizing the SL packet and generating a flexible multiplex (FlexMux) packet;
  packetizing controlling means for controlling the FlexMux packet to be converted into a packet having a different format according to necessity of synchronization of the FlexMux packet;
  PES packetizing means for packetizing the FlexMux packet and generating a PES packet by using the synchronization information;
  14496-section packetizing means for packetizing the FlexMux packet and generating a 14496-section packet;
  PSI generating means for generating a program specific information (PSI) by using an initial object descriptor (IOD), which is meta information extracted in said object separating and information generating means, and the program information; and
  TS packetizing means for packetizing the PES packet, the 14496-section packet and the PSI and generating the MPEG-4 transport stream (TS) packet.

4. A method for generating and transmitting moving picture expert group-4 (MPEG-4) data synchronized with MPEG-2 data, comprising the steps of:
  a) extracting MPEG-4 object data and meta information related to the MPEG-4 object data from mp4 data, which is a storage type of the MPBG-4 data and analyzing the meta information;
  b) packetizing the MPEG-4 object data by using meta information, thereby generating a primary packetized MPEG-4 object data, a flexible multiple (FlexMux) packet;
  c) generating synchronization information and program information by using the meta information and header information of the FlexMux packet by using a composition time stamp (CTS), which is meta information extracted at said step a), and FlexMux length information included in the header information of the FlexMux packet;
  d) packetizing the FlexMux packet by using the meta information, the synchronization information and the program information, thereby generating a secondary packetized MPEG-4 object data, a MPEG-4 transport stream (TS) packet; and
  e) multiplexing the MPEG-4 TS packet and MPEG-2 data and outputting a transport stream (TS) packet.

5. The method as recited in claim 4, wherein said step b) includes the steps of:
  b1) packetizing the MPEG-4 object data by using the meta information and generating a sync layer (SL) packet; and
  b2) packetizing the SL packet and generating the flexible multiplex (FlexMux) packet.

6. The method as recited in claim 5, wherein the FlexMux packet includes a FlexMux header and a sync layer (SL) packet data unit (PDU).

7. The method as recited in claim 4, wherein said step c) includes the step of:
  c1) generating the program information by using an elementary stream identifier (ES_ID), which is meta information extracted at said step a), and a FlexMux-Channel information included in the header information of the FlexMux packet.

8. The method as recited in claim 7, wherein the CTS is converted into a program time stamp/decoding time stamp (PTS/DTS).

9. The method as recited in claim 7, wherein said step d) includes the steps of:
  d1) generating a control signal for controlling the FlexMux packet according to necessity of synchronization of the FlexMux packet;
  d2) generating program specific information (PSI) by using an initial object descriptor (IOD), which is meta information extracted at said step a), and the program information;
  d3) packetizing the FlexMux packet by using the synchronization information based on the control signal and generating a packetized elementary stream packet;
  d4) packetizing the FlexMux packet based on the control signal and generating a 14496-section packet; and
  d5) packetizing the PSI, the PES packet and the 14496-section packet and generating the MPEG-4 transport stream (TS) packet.

10. The method as recited in claim 9, wherein said step d1) includes the step of generating a program map table (PMT), which is a part of program information, by inputting the program information to a FlexMux Channel descriptor (FM-C_Descriptor).

11. The method as recited in claim 7, wherein said step e) includes the steps of:
  e1) receiving MPEG-2 data and a synchronization initial value through an external interface; and
  e2) multiplexing the MPEG-4 TS packet and the MPEG-2 data based on the synchronization initial value and generating the transport stream (TS) packet.

12. The method as recited in claim 11, wherein in said step e2), the MPEG-4 TS packet having a relative time value is synchronized with the MPEG-2 data having an absolute time value by using a multiplex initial value as an insertion point of the MPEG-4 data.

13. A computer readable medium encoded with a computer program representing instructions which cause a computer to perform a method for transmitting MPEG-4 data synchronized with MPEG-2 data, the method comprising the steps of:
  a) extracting MPEG-4 object data and meta information related to the MPEG-4 object data from mp4 data, which is a storage type of the MPEG-4 data and analyzing the meta information;
  b) packetizing the MPEG-4 object data by using meta information, thereby generating a primary packetized MPEG-4 object data, a flexible multiple (FlexMux) packet;
  c) generating synchronization information and program information by using the meta information and header information of the FlexMux packet by using a composition time stamp (CTS), which is meta information extracted at said step a), and FlexMux length information included in the header information of the FlexMux packet;
  d) packetizing the FlexMux packet by using the meta information, the synchronization information and the program information, thereby generating a secondary packetized MPEG-4 object data, a MPEG-4 transport stream (TS) packet; and
  e) multiplexing the MPEG-4 TS packet and MPEG-2 data and outputting a transport stream (TS) packet.

* * * * *